(12) United States Patent
Britcher

(10) Patent No.: US 7,484,461 B2
(45) Date of Patent: Feb. 3, 2009

(54) I-BEAM TROLLEY

(76) Inventor: James K Britcher, 7550 St. Helena Rd., Santa Rosa, CA (US) 95404

( * ) Notice: Subject to any disclaimer, the term of this patent is extended or adjusted under 35 U.S.C. 154(b) by 181 days.

(21) Appl. No.: 11/531,371

(22) Filed: Sep. 13, 2006

(65) Prior Publication Data

US 2007/0101894 A1    May 10, 2007

Related U.S. Application Data

(60) Provisional application No. 60/736,518, filed on Nov. 10, 2005, provisional application No. 60/754,588, filed on Dec. 19, 2005.

(51) Int. Cl.
*B61B 3/00* (2006.01)
*B61B 7/00* (2006.01)

(52) U.S. Cl. .......................... 104/89; 105/150
(58) Field of Classification Search ............... 104/89, 104/90, 91, 93, 94, 95, 106, 107, 111
See application file for complete search history.

(56) References Cited

U.S. PATENT DOCUMENTS

| 2,834,435 | A | * | 5/1958 | Vanderbeck | ............... 188/42 |
|---|---|---|---|---|---|
| 3,102,607 | A | | 9/1963 | Roberts | |
| 3,696,890 | A | * | 10/1972 | Armstrong | ................... 186/40 |
| 3,999,630 | A | * | 12/1976 | McPhee | ....................... 186/40 |
| 4,898,099 | A | | 2/1990 | Summa | |
| 5,224,912 | A | * | 7/1993 | Moody | ....................... 482/87 |
| 5,524,548 | A | * | 6/1996 | Fox | .............................. 104/89 |
| 5,678,663 | A | | 10/1997 | Watanabe et al. | |
| 5,685,227 | A | * | 11/1997 | Gaccetta et al. | ............. 105/150 |

* cited by examiner

*Primary Examiner*—S. Joseph Morano
*Assistant Examiner*—Robert J McCarry, Jr.
(74) *Attorney, Agent, or Firm*—Edward S. Sherman

(57) ABSTRACT

A trolley for transporting objects hanging from an I-beam normally securely grips or latches to the I-beam via a pair of brake pads that are urged upward against the bottom of the beam by a torsion spring. The torsion spring is released by pulling a lever downward. Applying lateral force to the trolley, preferably by applying a lateral force to the same lever, pulls the trolley along the I-beam as the wheels engaging the upper portion of the I-beam can rotate freely once the brake pads are released. Releasing the lever after the trolling is pulled to the desired location causes the brakes to again firmly grip the I-beam.

20 Claims, 4 Drawing Sheets

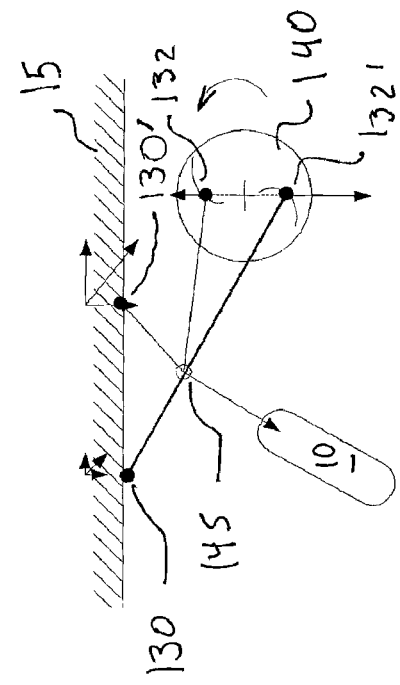
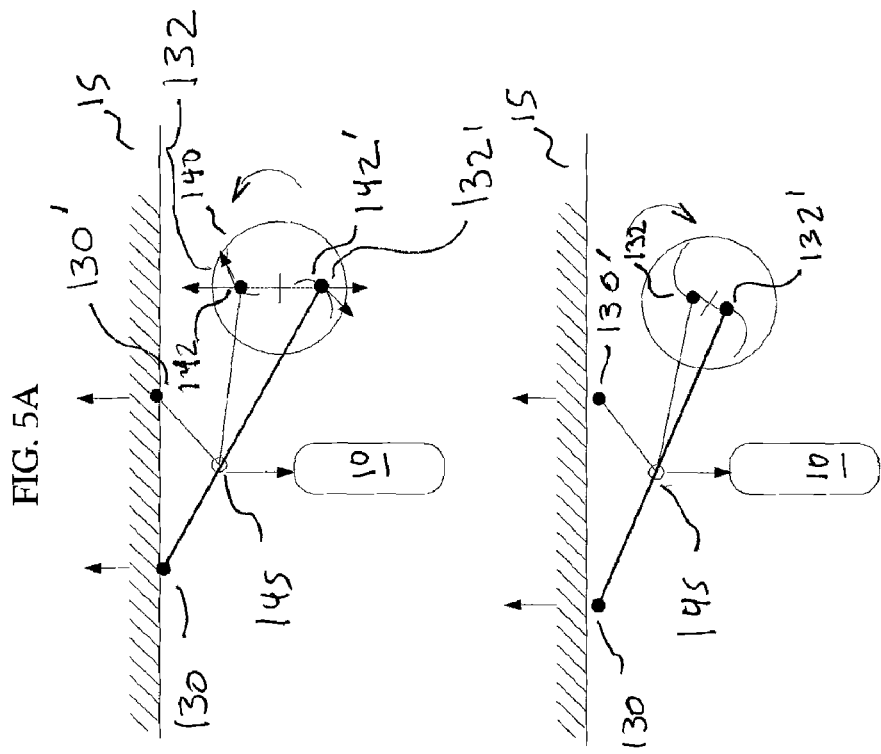

I-BEAM TROLLEY

CROSS REFERENCE TO RELATED APPLICATIONS

The present application claims priority to the U.S. provisional application having Ser. No. 60/736,518 entitled "Trolley Brake", filed on Nov. 10, 2005 by the Applicant, James K. Britcher, which is incorporated herein by reference.

The present application also claims priority to the U.S. provisional application having Ser. No. 60/754,588 entitled "Kick Bag Trolley Beam System", filed on Dec. 19, 2005 by the Applicant, James K. Britcher, which is incorporated herein by reference.

BACKGROUND OF INVENTION

The present invention relates to a system and apparatus for transporting objects along an overhead beam or track, and in particular to a transport mechanism having a braking means particular suitable for the transport of punching or kick bags in a gymnasium or Dojo.

Prior methods of using an overhead transport system are well known. Typically, a rolling trolley is suspended from an overhead rail or track. The trolley includes wheel that engage the track and a brake mechanism for locking the wheels or otherwise preventing the movement of the trolley after the objected suspended therefrom has been moved to the desired location on the rail.

Such trolleys have been developed and are used for transporting industrial equipment. Other uses suggested in the literature are for transporting patients and food. It should be appreciated that while there are many ways to configure such a trolley and braking system, the development of this art has only evolved to the point to meet the needs of the particular industry and application. In particular, such a system would be expected to take into account the weight and size of the object being transported, whether machinery is used to power the trolley, the need for automation.

The current invention addresses the recently discovered and unmet need for a trolley and system adopted to the transport kick/punching bags that are used in a gymnasium or dojo.

Such kick/punching bags are suspended from above so that the can swing freely when punched or kicked. Typically, a gymnasium is used for multiple purposes. As such, it would be convenient to be able to store the kick/punching bags when not needed, but have them available with a means for rapid deployment throughout the facility, spacing them apart to safely accommodate a large number of athletes.

Overhead rail transport systems are generally capable of supporting such bags in a clustered arrangement for storage, and generally transporting them to the dispersed location for use. It has been discovered by the inventor that the state of the art such trolley and their brake and release mechanism are not suitable to support kick/punching bags that are used in a gymnasium or dojo.

In particular, there is a need for the rapid deployment and return of the bags, it is desirable that the Athletes themselves can deploy them. However, such deployment must be done safely, taking into account that the age and skill of the athletes can vary considerably, as it is unlikely that they will receive or recall the type of safety training that would be given in industrial or commercial establishments. Given that such bags frequently weight more than an adult and are going to subject to repeated impact from the athletes it is of parameter important that they do not move or slip once they are moved to the desired location.

Accordingly, there is a need for a system for conveying and supporting kick/punching bags that is particularly adapted to disperse then from a clustered arrangement for storage in a gym or Karate dojo to a different arrangement where they are accessible to the athletes.

It is therefore a first object of the present invention to provide such a transport system wherein the kick/punching bags is readily released from a locked position on the rail.

It is a further object of the invention to provide such a system wherein it is relatively easy to transport the bag along the rail.

It is still another object of the invention to provide a system where the bag will not move or come loose once it is moved.

SUMMARY OF INVENTION

In the present invention, the first object is achieved by providing a combination of supporting posts, suspended rails and rolling trolleys that support the punching/kick bags. Each trolley supports the punching bag from a lower fixture and also has an upper fixture to securely grips or latches to the suspended rails. In particular, the trolley is configured such the user/athlete applies lateral force to the trolley via a lever to pull the bag along the rail. Pulling the lever also releases a brake such that when the bag reaches the desired to location releasing the lever causes the brakes to again firmly grip the rails.

Most preferably, a second aspect of the invention is characterized in that the brake mechanism is resilient to lateral motion of the trolley inducing by the swinging mass of the bag suspended below. Such a trolley deploys a pair of spaced apart wheels that engage one portion of the rail and a pair of brake pads disposed to apply frictional force to the underside of the rail opposite the pair of wheel. In particular, the brakes are configured to latch via a single cog mechanism that tightens the brakes as the punching/kick bag swings.

Accordingly, such a rail/I-beam, trolley and brake system provides for the secure gripping of the bag to the an I-beam when the brake is locked to resist momentum transfer when the bag swings as well as the facile unlatching from the and ease of transport along I-beam to an alternative position.

The above and other objects, effects, features, and advantages of the present invention will become more apparent from the following description of the embodiments thereof taken in conjunction with the accompanying drawings.

BRIEF DESCRIPTION OF DRAWINGS

FIG. 5A is a vector diagram illustrating the operative principle of the braking system in the engaged state.

FIG. 5B is a vector diagram illustrating the operative principle of the braking system in the released state.

FIG. 5C is a vector diagram illustrating the operative principle of the braking system in the engaged state when the bag swings to the left.

FIG. 5D is a vector diagram illustrating the operative principle of the braking system in the engaged state when the bag swings to the right.

DETAILED DESCRIPTION

Figure 2:
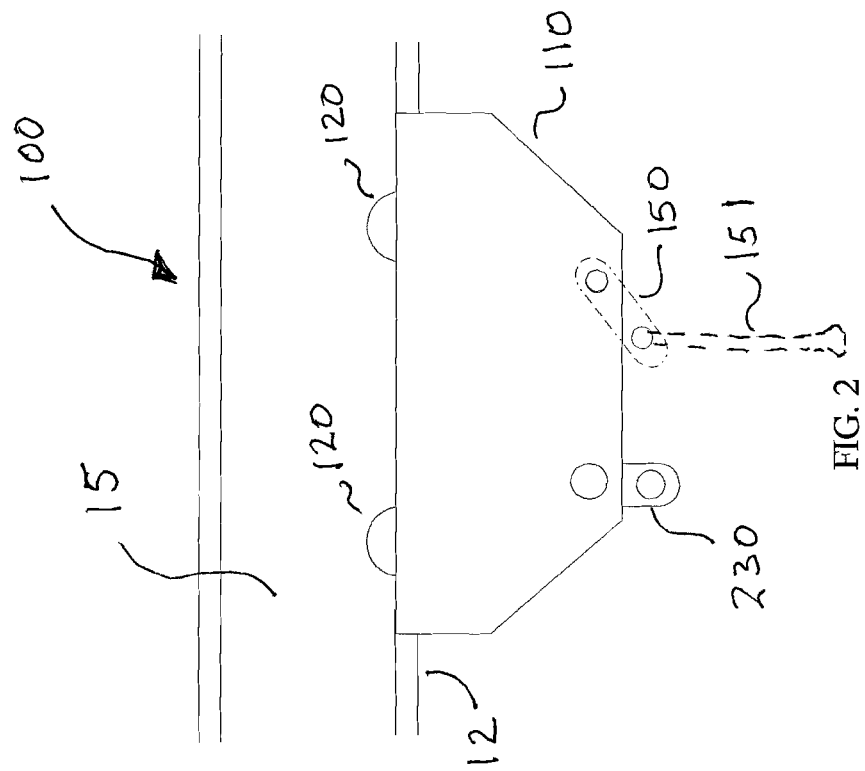
FIG. 2 an external elevation view of the trolley of FIG. 1
Figure 1:
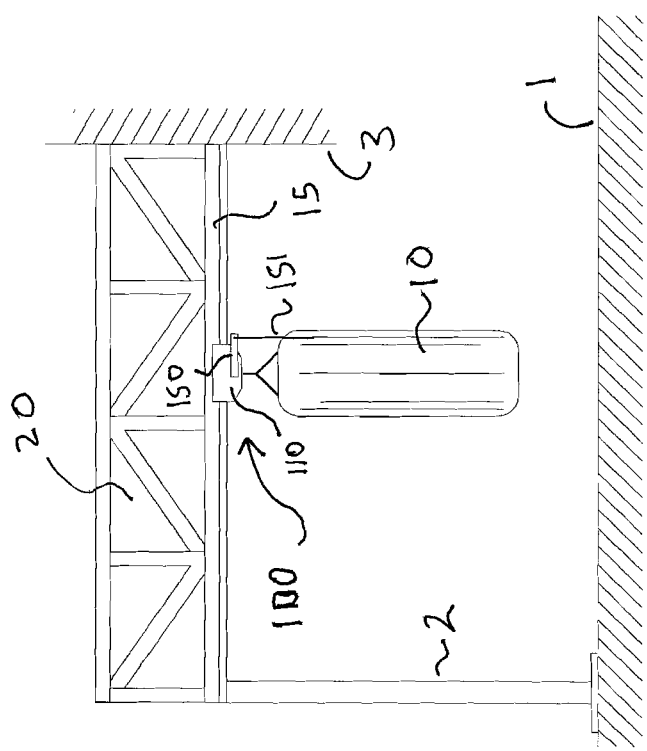
FIG. 1 is an elevation of a trolley system supporting a kick bag above the floor.
Figure 3:
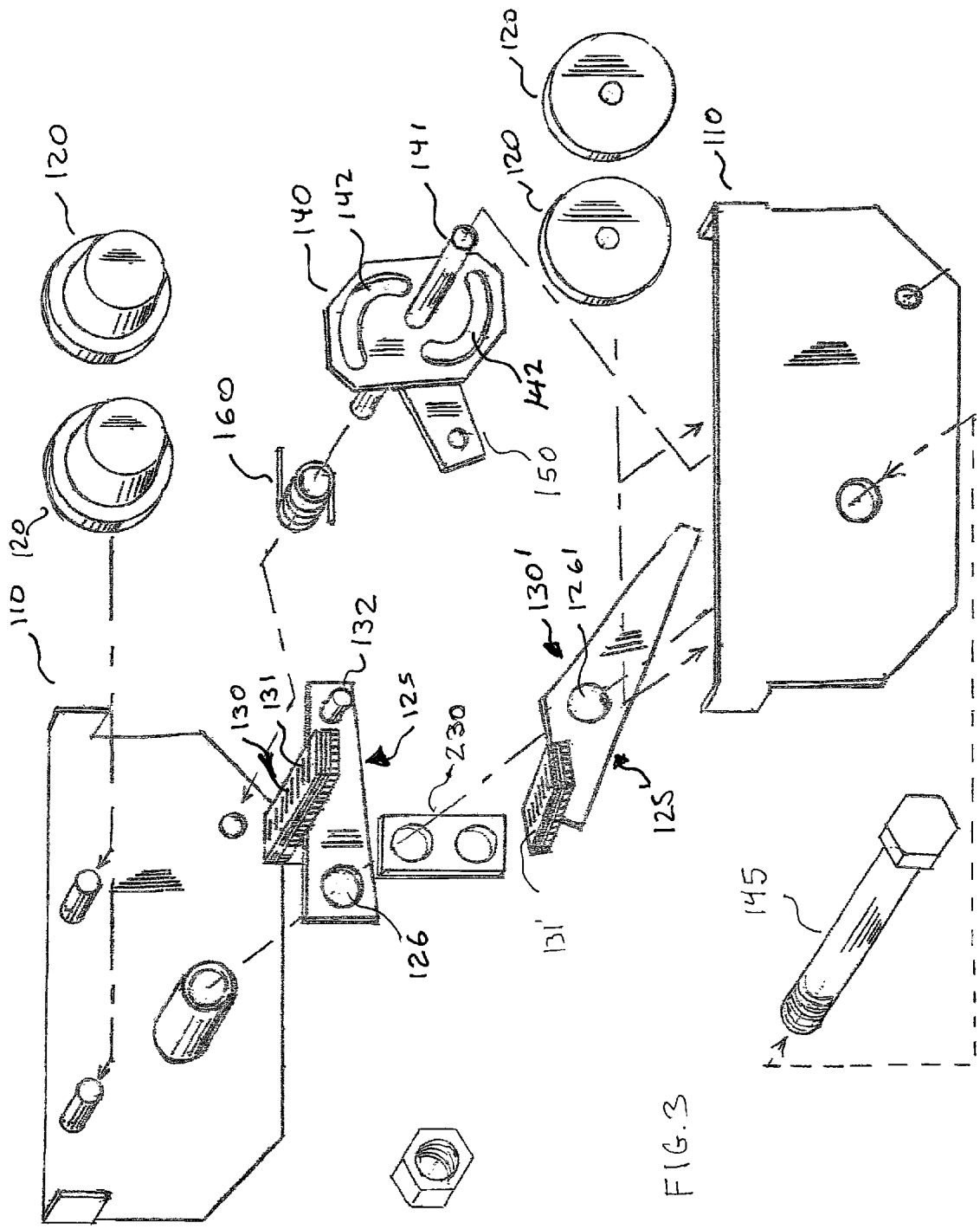
FIG. 3 is an exploded view of the trolley of FIG. 1
Figure 4B:
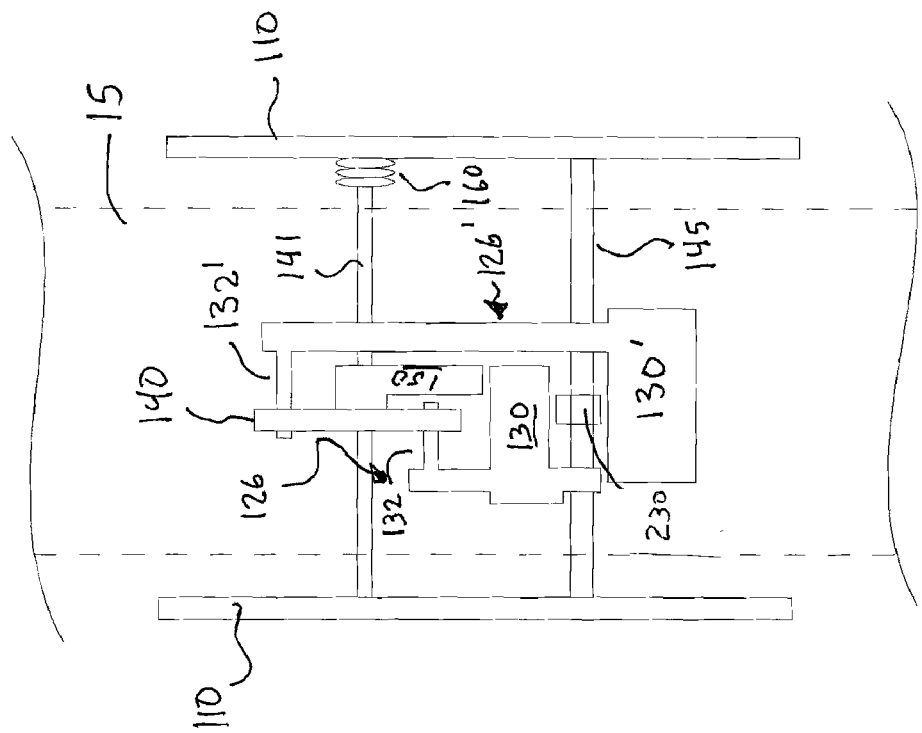
FIG. 4B is a cross-sectional plan view of the I-beam trolley of FIG. 2.
Figure 4A:
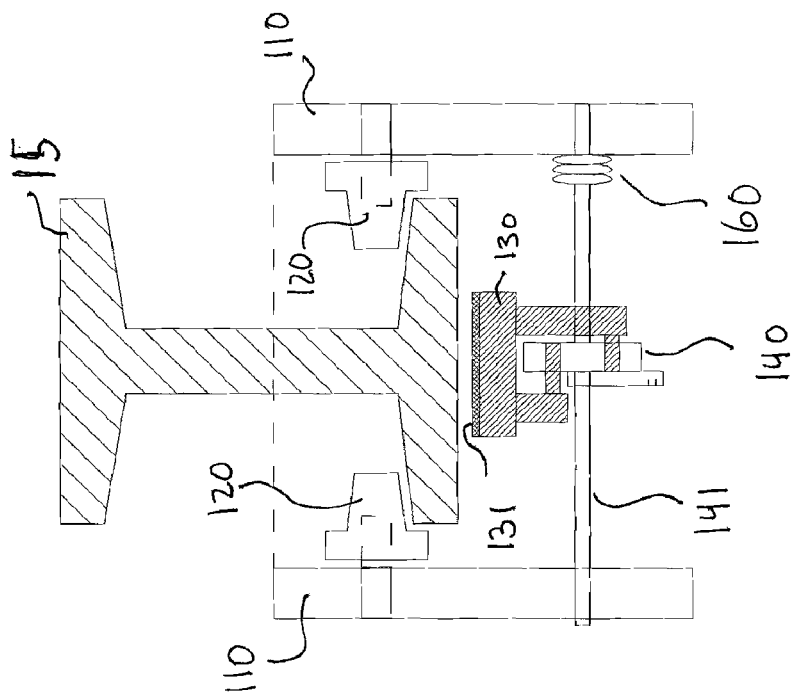
FIG. 4A is a cross-sectional elevation of the I-beam trolley of FIG. 1 orthogonal to the view in FIG. 2

Referring to FIGS. 1 through 5, wherein like reference numerals refer to like components in the various views, there is illustrated therein a new and improved I-Beam Trolley, generally denominated 100 herein.

In accordance with the present invention, the kick bag 10 is suspended from the I-beam trolley 100. The trolley rollingly engages I-beam 15. I-beam 15 is suspended above the floor 1 at a first position by a post 2. The other side of the I-beam 15 is shown as being held by a vertical surface 3 which is optionally another post, a wall or a overhead descending fixture or support.

The I-beam is stiffened by an integral truss 20.

The I-beam trolley in FIGS. 1 through 4 comprises a trolley body made of plates 110, having wheels 120 that engage the horizontal extending track or ledge 11 of I-beam 15. When the bag 10 has been moved to the desired location, and is not intended to move when kicked, the trolley 100 is prevented from rolling via wheel 120 by a braking mechanism that applies a lateral force against the bottom surface 12 of I-beam 15 via the upper surface or brake pad 131 of at least one break plate 130. The break plates 130 and 130' are each preferably disposed below each pair of wheels 120. The break plates 130 and 130' are ordinarily engaged between a latched locking mechanism when the athlete is not moving the bag along the rail, as the latch must be released to disengage the brake. The force applied to release the latch also pulls the trolley along the beam 15.

In particular break plates 130 and 130' are generally disposed to extend out laterally at the distal end of break arms 125 and 125' respectively. Each break arm has a hole or rotary bearing receiving portion 126 between the distal and proximal ends so that pivoting about this rotary axis urges the brake plate against bottom surface 12. The hole or rotary bearing receiving portion 126 engages shaft 145 that extends between each of the side plates 110 that comprise trolley body 110. The proximal ends of each break arm 125 and 125' have laterally extending pin 132 and 132' respectively. A rotary cam 140 has a pair of spiral grooves 142 and 142' for engaging laterally extending pins 132 and 132' respectively. Cam 140 is central disposed about rotary shaft 141. Either shaft 141 or cam 140 has lever arm 150 extending at right angles from shaft 141. Lever arm 150 is pulled downward to release or unlatch the break mechanism. A torsion spring 160 is axial disposed about shaft 141 being coupled at opposite ends to the plate 110 and the cam 140 or lever 150. The torsion spring 160 urges the cam 140 to rotate in the counter clockwise direction in this embodiment. As the spiral groove 142 and 142' radiate outward from the center of cam 140, rotating the cam 140 by lever arm 150 urges the pins 132 and 132' to greater separation in the vertically disposed plane common with cam 140. As the brake arms have a common pivot point on shaft 145 that is disposed between break plates 130, it should be appreciated that such movement of the cam 140 caused by the spring 160 causes the break plates 132 and 132' to swing toward each other. As shown in the schematic diagram in FIG. 5A, break plate 132' rotates upward in the clockwise direction with respect to the pivot axis, and break plate 132 rotating counterclockwise. Thus, such cooperative motion of the break plates causes both break pads 131 and 131' to press against the underside or bottom surface 12 of I-beam 15. Brake pads are preferably rubber. Further, the wheels 120 are preferably "DELRIN"® grade plastic.

It should now be appreciated that noted that each break plate is disposed vertical downward and on the opposite side of the I-beam from each of the opposing pairs of wheels 120. It has been found that this configuration offers the maximum stability, as will be further explained with reference to FIG. 5.

When it is desired to move the trolley, and hence transport for example punching bags along I-beam 15, the break is released by pulling downward on release lever 150. Typically, a rope or cable 151 is attached to the end of release lever 150. Thus, continued pulling of either cable 151 or lever 150 results in the trolley rolling freely on the I-beam or track. Thus, when the user or athlete has positioned the bag 10, the mere release of the lever 150 relocks the bag 10 in a secure fixed position. Accordingly, the release and movement of the bags is simple and intuitive, requiring little instruction, yet provides a reliable method of assuring that the bags are secure before the athlete uses it for practice and exercise.

Preferably, the cam 140 has two arcuate grooves 142 and 142' as shown in FIG. 2 for actuating dual break plates 130 and 130', each of which is urged to contact the dual break plates 130 and 130' straddling both sides of the hanging fixture 230, which is suspended from the underside of trolley 100, provide the benefit of resisting movement in response to an momentum in any direction. Such momentum is generated by hanging a punching or kick bag from hanging fixture 230, which in this embodiment is shown as hanging from the shaft 145 that acts as a pivot axis for break arms 125 and 125'. More preferably, the grooves are portion of a spiral curve having the shape of logarithmic spiral, equiangular spiral or growth spiral, which is similar to a spiral following the so-called "golden ratio" has a ratio of the base to height of about 1.6180.

As will be first explained with reference to FIG. 5, the brake mechanism is resilient to lateral motion of the trolley inducing by a swinging mass suspend below. Accordingly, the trolley is particularly adapted for transporting punching bags to disperse then from a clustered arrangement for storage in a gym or Karate dojo to a well dispersed arrangement where they are accessible to the athletes.

As shown in FIG. 5 A, the two brakes arms 125 and 125' pivot about a common axis 145. This common axis 145 is between the brakes point or region of contact with the bottom of the I-beam, under each pair of wheels. As the pivoting movement is controlled by cam 140 the spring 160 urges the cam 140 the counter clockwise. The lever end of each brake arm is connected to the cam 140 by a pin that slide within opposing spiral slots 142 of the cam 140. Thus, as the torsion spring 160 urges the cam 140 counterclockwise, each of the lever arm ends are driven outward from the center of the cam, and applying an upward force at the brake pad end of each arm against the underside of the beam. it should be noted in FIGS. 5A and 5B that as force, represented as a vector by the downward arrow on the bag, is opposed by the rail at the contact point with the wheel, shown by upward pointing arrows above the rail.

As shown in FIG. 5B, the brakes are both released by rotating the cam 140 in the counter clockwise direction, as this causes the cam connected end of each brake arm to move toward each other being driven by the opposing spiral slots 142 in the cam 140.

Not wishing to be bound by theory, FIGS. 5C and 5D illustrate how it is currently believed that the cam 140 mechanism further secures the brake system as the bag oscillates. First, it should be appreciated that as the bag swings up, the loading on the wheels 120 will be reducing. However, the bag still loads the trolley 100, as shown by the vector that swings with the bag. To the extent that one wheel pair exerts move lateral force to roll than the other, the associated and opposing break pad must exert a correspondingly higher force. The direction of these forces is best understood by considering that the load on the bag is directed in the direction the bag swings, as shown by the arrow that points into the bag. The expected force exerted by the wheel is now illustrated including the horizontal and vertical load components represented as decomposed vectors by the arrows originating at the point at the upper portion of the rail opposite each break pads. This force, when transferred to the wheel is no longer normal to the rail, with the horizontal component inducing the bag to more but for the resistance from the break pads. As the bag swings to the right in FIG. 5C, the right wheel is unloaded so the majority the lateral force is coming from the left wheel. The cam 140 takes advantage of this imbalance to actually tighten, as the break lever associated with the right (rear) break can now imparts a greater upward force to the cam, not being loaded by the right wheel. The greater force urges the cam clockwise, applying more force to the opposite lever arm and compensating for the effect of momentum that otherwise weakens that break.

The same benefit is realized when the bag swings to the left as shown in FIG. 5D. When the bag swings to the left the left wheel is unloaded so the right brake pad must resist the force directed to the left. The break lever associated with the left (front) break pad can now imparts a greater upward force to the cam, not being loaded by the left wheel. This larger force in turn also drives the cam 140 counter clockwise urging the opposite break arm outward along the groove to exert more force on the rail or track.

It should now be appreciated that the cyclic unbalance of the break mechanism, that results from the swinging bag, rather than loosening the brake mechanism, actually tightens it. Further, the spiral grooved path in the cam is of sufficient length to accommodate variation in the thickness of the brake pad as well as the wear that can be expected to occur.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

Thus it should be understood, that although the trolley mechanism 100 has been described in the contest of being adapted to roll along and grasp an I-beam, the term I-beam is intended to embrace equivalents that include for example . . . I-beam includes any shaped beam that form a linear or curvilinear track, being stiffened by connected horizontal and vertical disposed elongated plates, such as T-shapes, U shapes, squares and rectangular shaped channels and the like. One such equivalent track includes has horizontal groves that engage a matching member on the break plate 4 or more wheels. Alternatively, the wheels 120 may engage a different portion of such a rail system or I-beam.

It will also be understood by one of ordinary skill in the art, having the benefit of this disclosure, that such wheels can be replaced with gear and bicycle chain or roller bearings that are part of the trolley. Further, one of ordinary skill in the art, having the benefit of this disclosure, will also appreciate that Wheels, gear and bicycle chain, or roller bearings can be on the I-beam, instead of the trolley. Further, it should be understood that the hanging fixture for attaching the bag need not be attached directly to the trolley, but can have its own rollers and be pushed or pulled by the trolleys motion.

The invention claimed is:

1. A process for translating an object horizontally along an I-beam, the process comprising the steps of:
 a) providing a horizontally disposed I-beam,
 b) providing a trolley suspended from the I-beam in rolling engagement therewith, the trolley including a brake plate engaging the underside of the I-beam by the action of a spring biased by a releasing lever,
 (c) providing at least one pivoting break arm, having at one end said break plate,
 (d) pulling the releasing lever downward to release the break when the trolley is in a first position,
 (e) pulling the releasing lever laterally to transport the trolley along the I-beam to a second position,
 (f) disengaging the releasing lever to latch the trolley in the second position via the brake.

2. A process for translating an object horizontally along an I-beam according to claim 1 wherein a punching/kick bag is suspended from the trolley.

3. A process for translating an object horizontally along an I-beam according to claim 1 wherein the brake plate engages substantially all of the width of the underside of the I-beam.

4. A process for translating an object horizontally along an I-beam according to claim 1 wherein the releasing lever is pulled by a cable attached to the end thereof.

5. A process for translating an object horizontally along an I-beam according to claim 1 wherein the trolley comprises two pairs of wheels longitudinally spaced apart along the length of the I-beam, each wheel of each pair straddling opposing sides of the lower horizontal portion of the I-beam.

6. A process for translating an object horizontally along an I-beam according to claim 5 wherein the trolley comprises two brakes, each brake having a plate to engaging a portion of the underside of the I-beam directly below each pair of wheels longitudinally spaced apart along the length of the I-beam.

7. A transport system comprising,
 a) an I-beam horizontally mounted above a surface,
 b) a trolley in rolling engagement with and suspended from said I-beam, said trolley further comprising:
 i) a break plate engaging the underside of said I-beam,
 ii) at least on epivoting break arm having at one end said break plate,
 iii) a lever for releasing the break plate when pulled downward and transporting said trolley laterally,
 iv) a spring urging the break against the underside of said I-beam, wherein the spring is released from the break when the lever is pulled.

8. A transport system according to claim 7 further comprising a punching/kick bag suspended from said trolley.

9. A transport system according to claim 7 wherein the brake plate engages substantially all of the width of the underside of the I-beam.

10. A transport system according to claim 7 wherein the lever is pulled by a cable attached to the end thereof to release the break and transport said trolley.

11. A transport system according to claim 7 wherein the trolley comprises two pairs of wheels longitudinally spaced apart along the length of the I-beam, each wheel of each pair straddling opposing sides of the lower horizontal portion of the I-beam.

12. A transport system according to claim 8 wherein the lever is pulled by a cable attached to the end thereof to release the break plate and transport said trolley.

13. A transport system according to claim 7 wherein the trolley comprises two pairs of wheels longitudinally spaced apart along the length of the I-beam, each wheel of each pair straddling opposing sides of the lower horizontal portion of said I-beam.

14. A trolley for rolling engagement in a hanging position from a horizontal I-beam, the trolley comprising:
 a) a pair of trolley plates vertically disposed on opposing sides of the I-beam, the plates being connected by at least one members that extends transverse to the I-beam, b) One or more pairs of wheels having one side in rotating engagement with each of said trolley plates and the under side thereof in rolling engagement on a horizontal surface of the I-beam in the longitudinal direction of the I-beam, c) at least one pivoting break arm having at one end a horizontally disposed brake plate surface for contacting the underside of the I-beam and a break post extending laterally from the other end of said break arm, d) a cam having at least one arcuate slot for receiving the break post of said break plate, the cam being rotationally engaged about a first shaft that extends to each of said trolley plates, being in free rotational engagement therewith, e) a torsion spring disposed on the first shaft and coupled to the trolley plate for urging said break plate to engage the underside of said I-beam via the rotation of said cam, f) at least one release lever coupled to at least one of said cam and the first shaft to rotate said cam and disengage the break plate surface from the underside of said I-beam, g) wherein urging said release lever to oppose said torsion spring rotates the first shaft and said cam so as to disengage said break plate surface and allow the trolley to be transported along the I-beam via said one or more pairs of wheels.

15. A trolley for rolling engagement in a hanging position from a horizontal I-beam according to claim 14 further comprising a pair of brake arms disposed such that the brake plate of each brake arm engages a longitudinally spaced apart portions of the underside of the I-beam, with each said break arm having a common pivot axis disposed between the horizontally disposed upper surfaces thereof.

16. A trolley for rolling engagement in a hanging position from a horizontal I-beam according to claim 15 that comprises:
a) two pairs of wheels disposed at opposite ends of the trolley, and
b) a pair of brake plates, each brake plate being disposed to engage the underside of the I-beam below each of said pair of wheels.

17. A trolley for rolling engagement in a hanging position from a horizontal I-beam according to claim 15 that comprises:
a) a second shaft that extends between the trolley plates to provide the common pivot axis of said two break arms, and
b) a fixture for hanging a weighted object coupled to said second shaft.

18. A trolley for rolling engagement in a hanging position from a horizontal I-beam according to claim 16 wherein said cam comprises two arcuate slot symmetrically disposed on opposite sides of the rotation axis of the said cam, each arcuate slot receiving a break post of each of said break arms whereby rotation of the cam in opposite directions moves the break posts either toward or away from each other with respect to a line extending through the rotation axis of said cam.

19. A trolley for rolling engagement in a hanging position from a horizontal I-beam according to claim 18 and further comprising:
a) a second shaft that extends between the trolley plates to provide the common pivot axis pivot point of said two break plates, and
b) a fixture for hanging a weighted object coupled to said second shaft.

20. A trolley for rolling engagement in a hanging position from a horizontal I-beam according to claim 19 and further comprising a cable extending from the end of said release lever whereby pulling said cable releases the breaks plates from the underside of the I-beam and transports the trolley along the I-beam.

(c) providing at least one pivoting break arm, having at one end said break plate,

* * * * *